Figure 1:
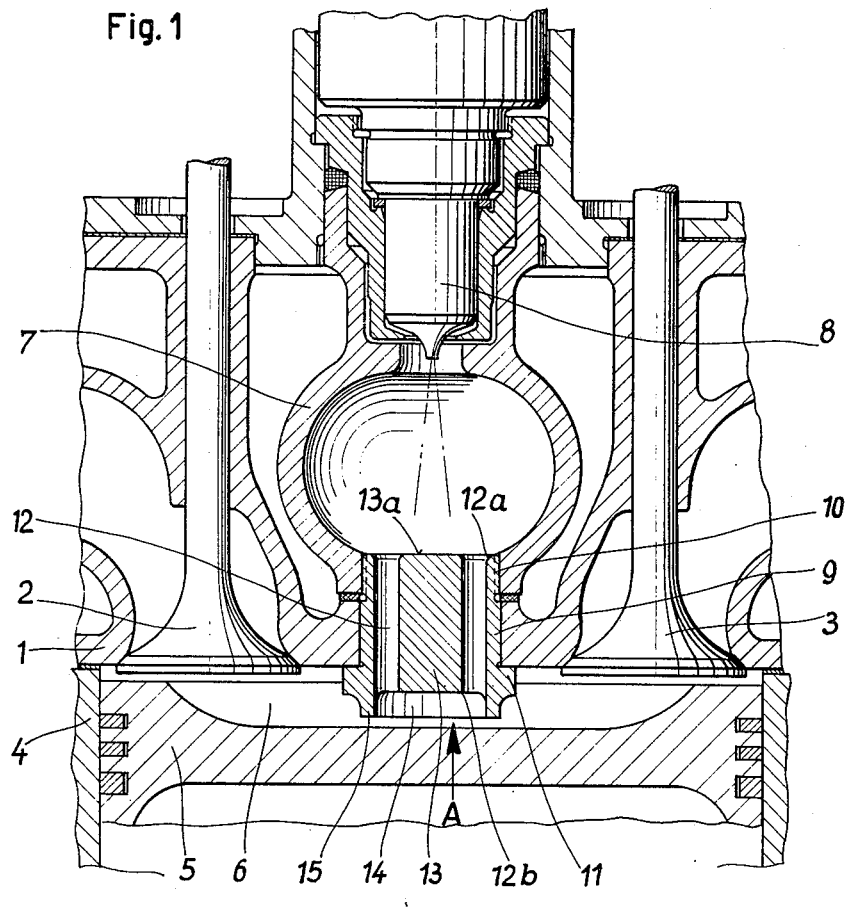

Jan. 22, 1957  W. VON MALLINCKRODT  2,778,347
FUEL INJECTION TYPE INTERNAL COMBUSTION ENGINE HAVING
A SUBDIVIDED COMBUSTION SPACE
Filed Dec. 24, 1953

INVENTOR.
WERNER VON MALLINCKRODT.
BY K. B. Mayr
ATTORNEY.

United States Patent Office 2,778,347
Patented Jan. 22, 1957

2,778,347

FUEL INJECTION TYPE INTERNAL COMBUSTION ENGINE HAVING A SUBDIVIDED COMBUSTION SPACE

Werner von Mallinckrodt, Friedrichshafen am Boden See, Germany, assignor to Maybach-Motorenbau G. m. b. H., Friedrichshafen, Germany, a German firm Application December 24, 1953, Serial No. 400,218

Claims priority, application Germany January 3, 1953

2 Claims. (Cl. 123—32)

The present invention relates to an injection type internal combustion engine having a subdivided combustion space, more particularly to a high speed diesel engine provided with a precombustion or mixing chamber.

In internal combustion engines of the aforesaid type it is intended to divide the fuel injected during each cycle and to distribute the fuel in the compressed air within the relatively short period between the beginning of the injection and ignition in order to produce the conditions for a complete combustion. This problem can be solved only, if the total amount of sucked-in air is pushed into the separate combustion chamber and subjected to a thoroughly turbulent motion. However, constructional limitations prevent pushing of the combustion air completely from the engine cylinder into a precombustion chamber. This requires a considerable pumping effort and entails considerable flow resistance when the combustion gases are discharged from the precombustion chamber back into the engine cylinder.

Therefore only a portion of the sucked-in air is moved into the separate combustion chamber of conventional engines. Usually an isert or burner is arranged between the separate combustion chamber and the cylinder, the insert having a plurality of bores for subdividing the air flowing into the combustion chamber into a plurality of jets. The turbulence which is desired for the preparation of the fuel mixture is counteracted by the drop of the air temperature caused by expansion of the air which is pushed into the precombustion chamber and which drop is so great that even an insulated so-called heat tight precombustion chamber cannot considerably reduce the resulting retardation of the ignition. The conventional multihole inserts promote only the atomization and distribution of the liquid fuel in the precombustion chamber, leaving an incomplete mixture of partly burnt gases and unburnt fuel particles with the air remaining in the main combustion space in the engine cylinder.

In another conventional combustion process the total fuel admitted for each cycle is immediately injected upon the piston head, through the precombustion chamber which is connected with the engine cylinder by means of a single channel or bore. Due to the initial ignition in the precombustion chamber and the subsequent blowing-off of the precombustion chamber, the fuel is mixed with the air in the cylinder. After ignition, a solid jet of fire is directed onto the piston head at every load condition of the engine, causing undesired high local heating whose effects are aggravated by erosion.

The present invention is an improvement of a precombustion or whirling chamber engine provided with the aforementioned multihole insert. According to the invention an insert is arranged between the precombustion chamber and the engine cylinder, the insert having a shallow recess facing the piston and extending into the cylinder to the piston head when the piston is in its inner dead center position.

Tests have shown that best results are obtained, if the flow area between the rim of the recess in the insert and the piston head in its inner dead center position is larger, for example 1.5 times as large, than the flow area of the multihole insert.

A portion of the combustion air is pushed into the precombustion chamber toward the end of the compression stroke and subdivided into individual jets by the passage through the bores of the insert, the number of the bores depending on the stroke volume and on the size of the precombustion chamber. The length of the jets is generally determined by the diameter of the bores. The fuel is injected in several jets at different angles, but as much as possible into the region of most violent turbulence. With certain engine sizes, it is preferred to use a one-hole or gudgeon nozzle through which the fuel is injected as a solid jet against a baffle surface of the hot burner core. The fuel jet is radially outwardly diverted by the baffle surface is caught by the several air jets and distributed in the air in the precombustion chamber. The chamber is blown down after the ignition.

The flowing off mixture of more or less burnt fuel particles and air does not immediately reach the main combustion space of the cylinder, at inner dead center position of the piston, but is at first dammed in the space formed by the recess at the end of the insert facing the piston. The rapidly increasing pressure in this space enables distribution of the fuel-air mixture over the whole piston head surface through the clearance between the rim of the recess of the insert and the piston in its inner dead center position, and whirling of the mixture with the compressed air remaining thereat. In this manner all of the injected fuel is equally distributed in the air available for combustion already in the region of the inner dead center position of the piston.

The losses caused by pushing the air into and blowing the gases out of the precombustion chamber are less in an arrangement according to the invention than in a conventional insert arrangement. Since the burning gases flowing from the precombustion chamber emerge in a plurality of small jets and not as a solid fire jet as in the conventional arrangement having a one-hole insert, the thermal load on the piston head is considerably smaller than in conventional engines.

The arrangement according to the invention is of particular advantage in connection with supercharged engines. Experiments with an engine supercharged by an exhaust turbo-compressor at the relatively low pressure of 1.8 atm. absolute have shown that the mean effective cylinder pressure increases to about 17 kg./cm.$^2$ and the fuel consumption goes down to 141 g. per effective H. P. hour which is extraordinarily small at the aforesaid low supercharging pressure.

The recess of the multihole insert according to the invention is preferably cylindrical having a diameter which is as great as that of a circle circumscribing the bores of the insert. The depth of the recess corresponds approximately to the diameter of a bore. The remaining length of the bores of the insert assures sufficient heating of the air which flows through the bores toward the end of the compression stroke to counterbalance the cooling of the air at its entry into the combustion chamber. The length of a bore is approximately five times as great as its diameter.

The arrangement of the individual bores is decisive for the life of the insert use in the engine according to the invention. They must be equally distributed as closely as possible to the circumference of the insert, leaving a relatively great core. The bores may be inclined or parallel to one another. The latter arrangement facilitates manufacture. In order to prevent burning of sharp edges at the inlets of the bores, the mouths of the bores facing the precombustion chamber are rounded, whereby also flow conditions are improved.

The core of the multihole insert is more exposed to continuously changing temperatures and thereby to greater thermal stresses at the different operating conditions of the engine than any other part of the engine. In order to assure most favorable heat conditions in the core, the space between the bores should be approximately equal to the diameter of a bore.

Most violent turbulence in the precombustion chamber for preparing and distributing the injected fuel is obtained in an approximately geoid-shaped chamber. Mixture of the fuel gas mixture emerging from the precombustion chamber with the air remaining in the cylinder is most complete if the piston head has a shallow cavity in which an eddy current is produced toward the end of the compression stroke due to displacement of the air above the rim of the piston. In high speed diesel engines according to the invention best performance and most favorable fuel consumption is obtained with a centrally located combustion chamber whose volume corresponds approximately to one half of the compressed air volumn.

The mulithole insert is preferably so constructed that it connects the combustion chamber with the cylinder head, for example by providing a shoulder and a thread which is fitted into a corresponding thread in the lower opening of the combustion chamber, the shoulder abutting against the face of the cylinder head.

Figure 2:
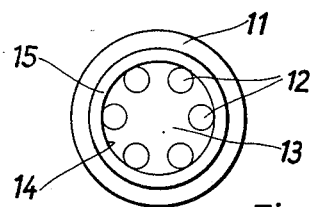

The novel features which are considered characteristic of the invention are set forth with particularity in the appended claims. The invention itself however and additional objects and advantages thereof will best be understood from the following description of an embodiment thereof when read in connection with the accompanying drawing in which Fig. 1 is a longitudinal section of the upper portion of an internal combustion engine according to the invention having a combustion chamber and multihole insert having a cylindrical recess and a piston having a head provided with a shallow cavity;

Fig. 2 is a bottom view of a multihole insert according to the invention looking in the direction of arrow A in Fig. 1.

Referring more particularly to the drawing, numeral 1 designates the cylinder head of the internal combustion engine which is provided with inlet and outlet valves 2 and 3. Numeral 4 designates the cylinder of the engine in which a piston 5 provided with a shallow cavity 6 is guided. A single-hole injection nozzle 8 is arranged in the upper side of a combustion chamber 7. A multihole insert 9 provided with six bores 12 is screwed into the chamber 7 by means of a thread 10, an annular rim 11 resting against the face of the cylinder head. The ends of the bores terminating in the combustion chamber are rounded at 12a, the ends of the bores facing the cylinder having sharp edges at 12b. The core 13 of the burner has a baffle surface 13a facing the interior of the combustion chamber. The insert has a cylindrical recess 14 having an outer wall 15.

A portion of the compressed air is pushed into the combustion chamber during the compression stroke, the air being heated while passing the bores 12. The flow velocity of the air is greatest toward the end of the piston stroke. The fuel is injected into the chamber 7 at that moment. The fuel jet emerging from the one-hole nozzle 8 has the form of a pointed cone and impinges against the baffle surface 13a of the multihole insert and is diverted in radial direction and is seized by the air circulating in the chamber. After initial ignition, the pressure rises greatly in the combustion chamber and the latter blows off. The burning mixture emerging through the bores 12 reaches the space formed by the recess 14 which is still almost closed by the head of the piston 5. Due to the resulting damming effect the fuel gas mixture is equally distributed over the piston head through the clearance between the wall 15 and the head of the piston 5. With the configuration of the piston head of the illustrated embodiment of the invention, mixing is additionally promoted by a supplemental whirling of the air caused by the displacing action of the rim of the cavity 6 in its upper dead center position.

The multihole insert according to the invention may be modified for particular conditions. If the precombustion chamber is large, the insert may extend into the chamber. The wall of the cylindrical recess of the insert may be provided with apertures or breaches of various configurations. The piston head may be provided with a recess whose diameter is somewhat greater than that of the insert which extends into the recess at inner dead center position of the insert or a protuberance may be provided on the piston head which extends into the recess in the insert when the piston is in inner dead center position.

What I claim is:

1. An injection type internal combustion engine comprising a cylinder, a piston reciprocable in said cylinder and having a head, a cylinder head, a combustion chamber in said cylinder head, fuel injection means connected with said cylinder head and terminating in said combustion chamber for injecting fuel thereinto, said combustion chamber having an outlet, an insert in said outlet, said insert extending into said cylinder and having an end surface parallel and adjacent to said piston head when the piston is in inner dead center position, said insert having a substantially cylindrical shallow recess facing said piston head, and a plurality of bores extending through said insert and connecting said combustion chamber with said recess for passing a combustible mixture from said combustion chamber into said recess and into said cylinder, said combustion chamber having a substantially spherical configuration, the portions of the combustion chamber located at the diameter of the combustion chamber extending coaxially of the longitudinal axis of said insert being flattened.

2. An injection type internal combustion engine comprising a cylinder, a piston reciprocable in said cylinder and having a head, a cylinder head, a combustion chamber in said cylinder head, fuel injection means connected with said cylinder head and terminating in said combustion chamber for injecting fuel thereinto, said combustion chamber having an outlet, an insert in said outlet, said insert extending into said cylinder and having an end surface parallel and adjacent to said piston head when the piston is in inner dead ceter position, said insert having a substantially cylindrical shallow recess facing said piston head, and a plurality of bores extending through said insert and connecting said combustion chamber with said recess for passing a combustible mixture from said combustion chamber into said recess and into said cylinder, said piston head being provided with a shallow cavity having a plane surface portion, said insert extending into said cavity and the end surface of the insert being parallel to said surface portion of said cavity when said piston is in outer dead center position.

References Cited in the file of this patent

UNITED STATES PATENTS

| 2,619,078 | Witzky et al. | Nov. 25, 1952 |

FOREIGN PATENTS

| 711,218 | France | Sept. 5, 1931 |
| 302,427 | Italy | Oct. 27, 1932 |

OTHER REFERENCES

Serial No. 368,293, Von Mallinckrodt (A. P. C.), published May 11, 1943.